(12) United States Patent
Kim (10) Patent No.: US 12,277,512 B2
(45) Date of Patent: Apr. 15, 2025

(54) VEHICLE AND METHOD OF CONTROLLING THE SAME

(71) Applicants: Hyundai Motor Company, Seoul (KR); Kia Corporation, Seoul (KR)

(72) Inventor: Hyeonjun Kim, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 192 days.

(21) Appl. No.: 17/519,213

(22) Filed: Nov. 4, 2021

(65) Prior Publication Data

US 2022/0270000 A1  Aug. 25, 2022

(30) Foreign Application Priority Data

Feb. 24, 2021 (KR) .................. 10-2021-0024504

(51) Int. Cl.
*G06Q 10/00* (2023.01)
*B60L 53/68* (2019.01)
*B60L 58/12* (2019.01)
*G06Q 10/02* (2012.01)
*G06Q 20/40* (2012.01)
*G07C 9/00* (2020.01)

(52) U.S. Cl.
CPC .............. *G06Q 10/02* (2013.01); *B60L 53/68* (2019.02); *B60L 58/12* (2019.02); *G06Q 20/401* (2013.01); *G07C 9/00571* (2013.01)

(58) Field of Classification Search
None
See application file for complete search history.

(56) References Cited

U.S. PATENT DOCUMENTS

| | | | |
|---|---|---|---|
| 10,450,091 B2* | 10/2019 | McMillian | G08G 5/025 |
| 10,726,379 B1* | 7/2020 | Donnelly | G05D 1/0088 |
| 10,773,598 B1* | 9/2020 | Yamasaki | B62J 45/40 |
| 2013/0030580 A1* | 1/2013 | Luke | B60L 58/26 700/286 |
| 2018/0197139 A1* | 7/2018 | Hill | G06Q 10/0838 |
| 2018/0286236 A1* | 10/2018 | Mazzola | G01C 21/3492 |
| 2019/0031075 A1* | 1/2019 | Koch | B25J 9/162 |
| 2019/0210468 A1* | 7/2019 | Wittl | H02J 7/00714 |
| 2019/0220044 A1* | 7/2019 | Ruth | B64U 80/86 |
| 2019/0322504 A1* | 10/2019 | Raab | G05D 1/028 |
| 2019/0354919 A1* | 11/2019 | Mahboob | G06F 16/2468 |

* cited by examiner

*Primary Examiner* — Tonya Joseph
(74) *Attorney, Agent, or Firm* — Fox Rothschild LLP

(57) ABSTRACT

A server includes a communicator, and a processor configured to: receive charging reservation information of an electric vehicle (EV) from a user terminal; based on the charging reservation information of the EV, transmit a request message for reservation of use of a last mile mobility (LMM) to a LMM module; transmit a response message responsive to the request message received from the LMM module, to the user terminal; and based on a user selection input being received from the user terminal, transmit an unlock request to the LMM module to unlock a LMM holder electrically connected to an EV charging station.

20 Claims, 7 Drawing Sheets

VEHICLE AND METHOD OF CONTROLLING THE SAME

CROSS-REFERENCE TO RELATED APPLICATION

This application claims under 35 U.S.C. § 119 the benefit of Korean Patent Application No. 10-2021-0024504, filed on Feb. 24, 2021 in the Korean Intellectual Property Office, the entire contents of which are incorporated herein by reference.

BACKGROUND

1. Technical Field

The present disclosure is related to a vehicle and a method of controlling the same.

2. Description of the Related Art

In the conventional art, after charging an electric vehicle, when a user desires to use a last-mile mobility (LMM) with which the user moves to a final destination, there is an inconvenience to the user of subscribing for a separate service, directly visiting a LMM business site to pay for the LMM, and after using the LMM, returning the LMM to the LMM business site.

Although attempts have been made to mount an LMM in a vehicle, there are several drawbacks to that approach, such as a decrease in vehicle fuel efficiency, mountability of an LMM, maintainability, a lack of driving range of an LMM due to mountability, charging technology, and applicable laws and regulations.

SUMMARY

The present disclosure provides a server that allows a user to make a reservation and pay for an LMM in advance and immediately use the LMM on the spot by linking an electric vehicle (EV) charging station with an LMM.

Additional aspects of the disclosure will be set forth in part in the description which follows and, in part, will be obvious from the description, or may be learned by practice of the disclosure.

According to an aspect of the disclosure, there is provided a server including: a communicator; and a processor configured to: receive charging reservation information of an electric vehicle (EV) from a user terminal; based on the charging reservation information of the EV, transmit a request message for reservation of use of a last mile mobility (LMM) to a LMM module; transmit a response message responsive to the request message received from the LMM module, to the user terminal; and based on a user selection input being received from the user terminal, transmit an unlock request to the LMM module to unlock a LMM holder electrically connected to an EV charging station.

The processor may be configured to, based on the charging reservation information of the EV, transmit a charging request for charging the LMM mounted on the LMM holder in the EV charging station, to the LMM module.

The response message may include at least one of reservation available time information of the LMM or payment information of the LMM.

The user selection input may include at least one of a selection input for selecting a reservation time for using the LMM or a selection input for proceeding with a payment for using the LMM.

The processor may be configured to, upon the EV vehicle being connected to the EV charging station, receive the charging reservation information of the EV based on a media access control (MAC) address of the EV, and based on the charging reservation information of the EV vehicle, transmit information about a current state of charge (SOC) of the EV and a remaining time until charging is completed to the LMM module.

The processor may be configured to transmit a notification message to at least one of the user terminal or the EV charging station based on the charging reservation information of the EV.

The notification message may include at least one of a notification for extending a use time of the LMM or a notification for guiding the LMM to be mounted on the LMM holder.

Upon a predetermined time elapsing since the LMM holder is unlocked, if it is determined that the LMM continues being mounted on the LMM holder, the processor may be configured to transmit a lock request to lock the LMM holder to the LMM module.

The processor may be configured to receive SOC information of the LMM and availability state information of the LMM from the LMM module in real time.

The LMM may include at least one of an electric kickboard, an electric bicycle, a skateboard, or a SEGWAY.

According to another aspect of the disclosure, there is provided a processing method of a server including: receiving charging reservation information of an electric vehicle (EV) from a user terminal; based on the charging reservation information of the EV, transmitting a request message for reservation of use of a last mile mobility (LMM) to a LMM module; transmitting a response message responsive to the request message received from the LMM module, to the user terminal; and based on a user selection input being received from the user terminal, transmitting an unlock request to the LMM module to unlock a LMM holder electrically connected to an EV charging station.

The method may include, based on the charging reservation information of the EV, transmitting a charging request for charging the LMM mounted on the LMM holder in the EV charging station, to the LMM module.

The response message may include at least one of reservation available time information of the LMM or payment information of the LMM.

The user selection input may include at least one of a selection input for selecting a reservation time for using the LMM or a selection input for proceeding with a payment for using the LMM.

The method may include: upon the EV vehicle being connected to the EV charging station, receiving the charging reservation information of the EV based on a media access control (MAC) address of the EV, and based on the charging reservation information of the EV vehicle, transmitting information about a current state of charge (SOC) of the EV and a remaining time until charging is completed to the LMM module.

The method may include transmitting a notification message to at least one of the user terminal or the EV charging station based on the charging reservation information of the EV.

The notification message may include at least one of a notification for extending a use time of the LMM or a notification for guiding the LMM to be mounted on the LMM holder.

The method may include, upon a predetermined time elapsing since the LMM holder is unlocked, if it is determined that the LMM continues being mounted on the LMM holder, transmitting a lock request to lock the LMM holder to the LMM module.

The method may include receiving SOC information of the LMM and availability state information of the LMM from the LMM module in real time.

According to another aspect of the disclosure, there is provided a charging station integration system including: a user terminal configured to receive charging reservation information of an electric vehicle (EV), and receive a selection for reservation of use of a last mile mobility (LMM); a LMM module configured to receive the charging reservation information of the EV from the user terminal, and transmit a response message responsive to a request message for reservation of use of the LMM to the user terminal; and a server configured to, based on the charging reservation information of the EV, transmit the request message for reservation of use of the LMM to the LMM module, and based on the selection received from the user terminal, transmit an unlock request to the LMM module to unlock a LMM holder electrically connected to an EV charging station.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles. The terminology used herein is for the purpose of describing particular embodiments only and is not intended to be limiting of the disclosure.

As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Like numerals refer to like elements throughout the specification. Not all elements of embodiments of the present disclosure will be described, and description of what are commonly known in the art or what overlap each other in the embodiments will be omitted.

It will be further understood that the term "connect" or its derivatives refer both to direct and indirect connection, and the indirect connection includes a connection over a wireless communication network.

In the specification, it will be understood that, when a member is referred to as being "on/under" another member, it may be directly on/under the other member, or one or more intervening members may in addition be present.

Although the terms "first," "second," "A," "B," etc. may be used to describe various components, the terms do not limit the corresponding components, but are used only for the purpose of distinguishing one component from another component.

Reference numerals used for method steps are just used for convenience of explanation, but not to limit an order of the steps. Thus, unless the context clearly dictates otherwise, the written order may be practiced otherwise.

Hereinafter, the principles and embodiments of the disclosure will be described with reference to the accompanying drawings.

Figure 1:
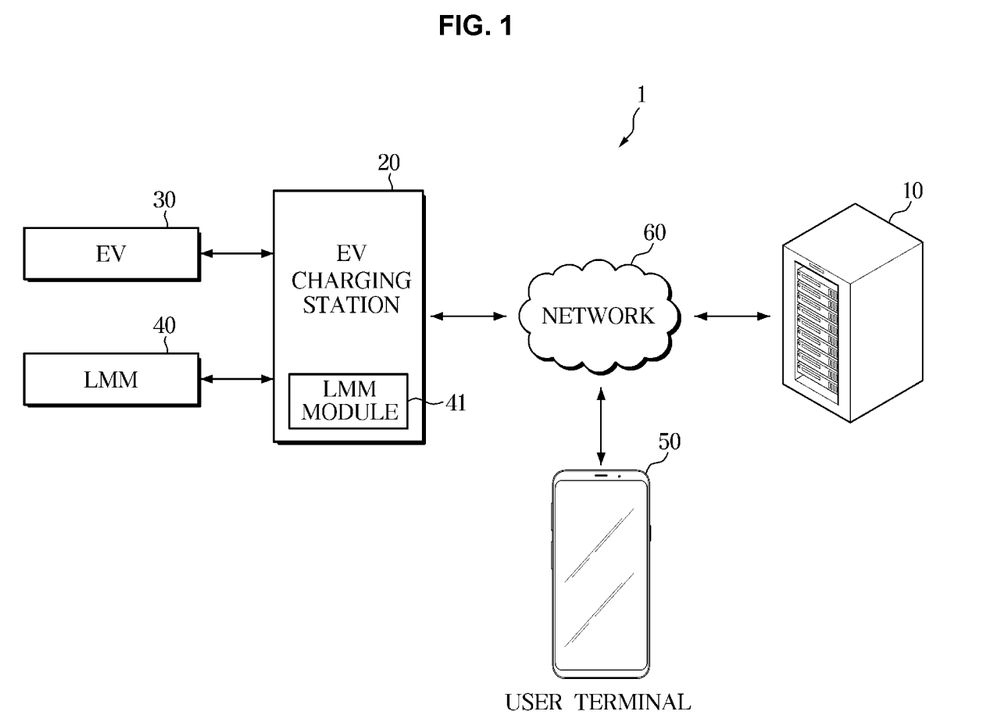
FIG. 1 is a diagram illustrating an integrated system of an electric vehicle (EV) charging station and a last-mile mobility (LMM) according to an embodiment of the disclosure.

FIG. 1 is a diagram illustrating an integrated system of an electric vehicle EV charging station and a last-mile mobility LMM according to an embodiment of the disclosure.

Figure 2:
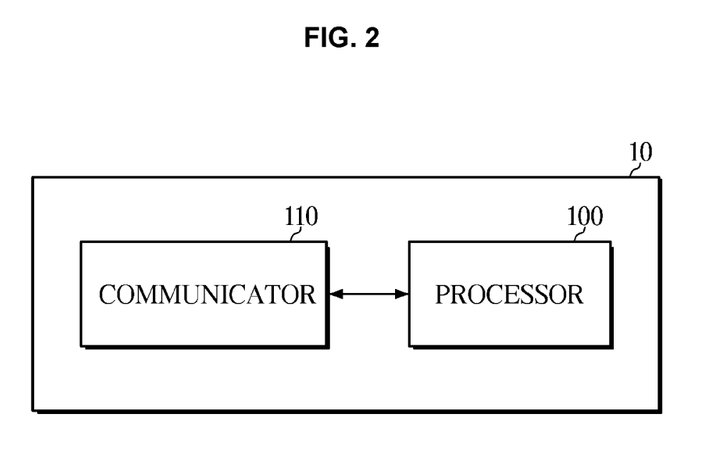
FIG. 2 is a block diagram illustrating a configuration of a server according to an embodiment of the disclosure.

FIG. 2 is a block diagram illustrating a configuration of a server according to an embodiment of the disclosure.

Figure 3:
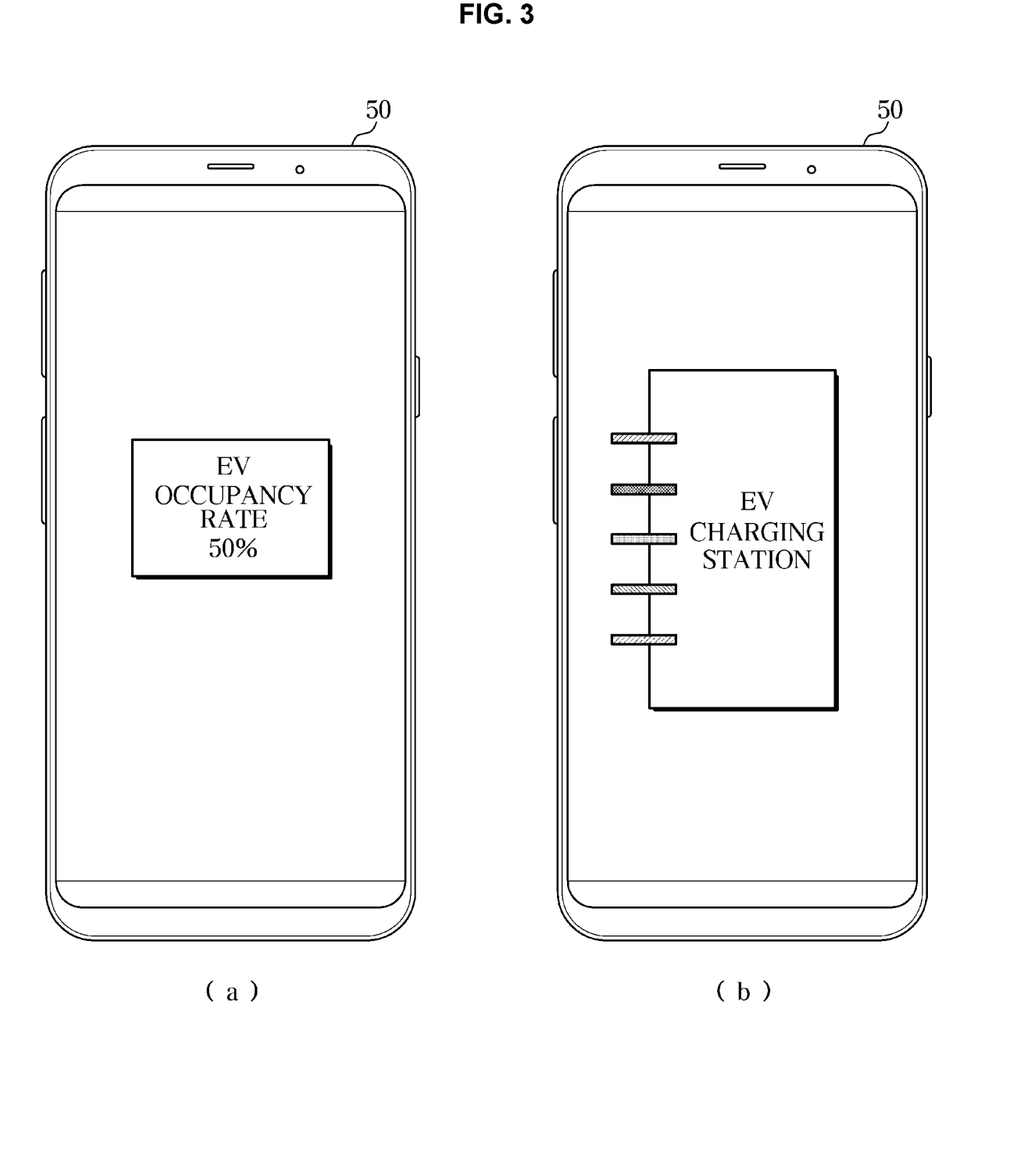
FIG. 3 is a diagram illustrating a display screen of a user terminal or an EV charging station according to an embodiment of the disclosure.

FIG. 3 is a diagram illustrating a display screen of a user terminal or an EV charging station according to an embodiment of the disclosure.

Referring to FIG. 1, an integrated system 1 includes a server 10, an electric vehicle (EV) charging station 20, an EV 30 connected to the EV charging station 20 to perform charging, a last mile mobility (LMM) 40 connected to the EV charging station 20 and perform charging using active power, a user terminal 50, and a network 60.

Referring to FIG. 2, the server 10 may include a processor 100 configured to: receive charging reservation information for charging the EV 30 input by a user from a communicator 110 and the user terminal 50; and based on the charging reservation information; transmit a request message for reservation of use of the LMM 40 to a LMM module 41; receive a response message responsive to the request message from the LMM module 41; transmit the response message to the user terminal 50; receive user selection input from the user terminal 50; and transmit a unlock request for unlocking a holder configured to mount the LMM 40 thereon based on the user selection input to the LMM module 41.

The server 10 may receive charging reservation information for charging the EV 30 input by a user from the user terminal 50, and may receive charging reservation information of the EV 30 input by a user through a display of the EV charging station 20. Here, it should be understood that the display of the EV charging station 20 may be a touch panel.

In addition, when it is determined that the user is located in the EV charging station 20, the server 10 may transmit a response message responsive to a request message for reservation of use of the LMM 40 based on the charging reservation information of the EV 30 to the EV charging station 20. The display of the EV charging station 20 may output the response message such that the user may recognize the response message.

The holder configured to mount the LMM 40 thereon may be a structure included in the EV charging station 20. In addition, the LMM 40 may include a locking device and a charging terminal for charging the LMM 40.

In other words, the LMM holder may be electrically connected to the EV charging station 20 to perform charging on the LMM 40 mounted on the LMM holder in the EV charging station 20.

Accordingly, the LMM 40, which is a transportation method from the EV charging station 20 to the final destination, may be effectively linked. In addition, the LMM 40 may be efficiently charged using active power of the EV charging station 20 that is not used for charging the EV 30.

The EV charging station 20 may have a structure that receives 440 V three-phase power, and converts the 440 V three-phase power to match a voltage of a vehicle battery and at the same time, converts the 440 V three-phase power to a low voltage DC power to match the charging power of the LMM 40.

The LMM 40 may include at least one of an electric kickboard, an electric bicycle, a skateboard, or a SEGWAY, but is not limited thereto.

The user may input charging reservation information for charging the EV through a user interface (UI) of the user terminal 50. In addition, the user may input charging reservation information for charging the EV through the display installed in the EV charging station 20. Here, the display may be a touch panel.

For example, referring to FIG. 3 (a), the user may check the state of occupancy, the state of charge, the state of fault, and the state of communication connection of a charger of the EV charging station 20 displayed on the user terminal 50. In particular, the state of occupancy (occupancy rate) of the charger of the EV charging station 20 may be displayed as 50%.

The user may input the charge reservation information through the user terminal 50 to make a reservation for charging, based on the state of occupancy, the state of charge, the state of fault, and the state of communication connection of the charger of the EV charging station 20. In addition, it should be understood that the user may input charging reservation information for making a reservation for charging the EV 30 through the display installed in the EV charging station 20.

Here, the charging reservation information may include at least one of a charging start time, a charging end time, and a state of charge (SOC) of the EV 30.

For example, the processor 100 may perform setting such that the user makes a reservation for charging the EV 30 in the user terminal 50 or the EV charging station 20 in units of 10 minutes or 30 minutes, and may perform setting such that the charging reservation time of the EV 30 is accurately input by considering a time taken for the user to physically connect the EV charging station 20 to the EV 30.

In this case, the display of the user terminal 50 and the EV charging station 20 may be a touch panel.

The processor 100 may transmit a charging request for charging the LMM 40 to the LMM module 41 based on the charging reservation information of the EV 30 input by the user.

For example, the processor 100 may transmit the charging request to the LMM module 41 such that the charging of the LMM 40 is completed before the charging reservation time of the EV 30 in order for the user to use the LMM 40 in the charging reservation time of the EV 30 input by the user.

The processor 100 may receive a response message including reservation available time information of the LMM 40 in which the LMM 40 is available by the user when the EV 30 is charged, and payment information of the LMM 40, based on the charging reservation information of the EV 30 desired by the user, from the LMM module 41.

The processor 100 may transmit the response message including the reservation available time information of the LMM 40 and the payment information of the LMM 40 to at least one of the user terminal 50 or the EV charging station 20 such that the user may check the response message.

The user terminal 50 and the EV charging station 20 may output at least one of the reservation available time information of the LMM 40 or the payment information of the LMM 40 through the display such that the user may check the at least one of the reservation available time information of the LMM 40 or the payment information of the LMM 40.

The processor 100 may associate a mileage according to the payment amount of the LMM 40 with a mileage according to a charging amount money (herein referred to as a charging amount) of the EV 30. In addition, the processor 100 may also transmit the mileage information to the user terminal 50 and the EV charging station 20 such that the user may recognize the associated mileage.

With such a configuration, not only a reservation for charging the EV 30, but also a reservation and payment for use of the LMM 40 may be performable in the EV charging station 20 or the user terminal 50, thereby increasing the convenience of use.

The processor 100 may check the state of charge (SOC) of the LMM 40, and transmit the checked SOC of the LMM 40 to the user terminal 50 and the EV charging station 20.

The processor 100 may, based on a real-time SOC of the LMM 40, check the state of availability of the LMM 40 and transmit the state of availability of the LMM 40 to the user terminal 50 and the EV charging station 20 in real time.

Here, the SOC may include states, such as a state of being charged and a state of completely charged, and the state of availability may include states, such as a state of being unavailable and a state of being rented.

For example, referring to FIG. 3 (b), the user terminal 50 may display LMMs 40 mounted on the LMM holder, and may indicate an LMM 40 in an unavailable state processed as a block. In addition, referring to FIG. 3 (b), a state in which charging of the LMM 40 is completed may be indicated by a dotted line, and a state in which charging of the LMM 40 is not completed may be indicated by an oblique line.

In this case, the user may select the LMM 40 desired to use in consideration of the SOC of each LMM 40 and the block processing indication indicating that a unavailable state.

The user may input a selection for using the LMM 40 based on at least one of reservation available time information, payment information, or SOC information of the LMM 40.

For example, the user may, based on the reservation available time information of the LMM 40, input a selection of a time at which the user desired to use the LMM 40 to make a reservation.

In addition, the user may, based on the payment information of the LMM 40, input a selection of a use time in consideration of the payment amount of the LMM 40 and whether the mileage is applicable according to the payment amount to make a reservation for use of the LMM 40.

In addition, the user may, based on the current SOC of the LMM 40 predict the SOC of the LMM 40 at a time desired by the user, and input a selection to make a reservation.

The processor 100 may receive, from one of the user terminal 50 and the EV charging station 20, the selection input by the user for a reservation time and a payment of the LMM 40.

The processor 100 may transmit a unlock request to the LMM module 41 to unlock the LMM holder based on the selection input by the user.

In particular, the processor 100 may, based on the reservation time information of the LMM 40, transmit an unlock request to the LMM module 41 to unlock the LMM holder such that the LMM 40 becomes available at the time reserved by the user.

For example, when the LMM holder is unlocked, the LMM holder may output a light emission or output a voice alarm such that the user may recognize that the LMM 40 is unlocked.

The processor 100 may, in response to detecting that the EV 30 is connected to the EV charging station 20 by the user, receive a media access control (MAC) address from the EV 30. The processor 100 may check charging reservation information of the EV 30 based on the received MAC address, and transmit a current SOC of the EV 30 and information about a remaining time until the charging of the EV 30 is completed to the LMM module 41.

In particular, the charger mounted in the EV charging station 20 may include an electric vehicle supply equipment (EVSE) communication control unit. The EVSE communication control unit may transmit the MAC address, the SOC information, and the remaining charging time from the EV 30 to the server 10 through a Programmable Logic Controller (PLC) communication with the EV 30.

The processor 100 may, in response to detecting that the EV 30 is connected to the EV charging station 20 by the user, transmit an unlock request to the LMM module 41 for the LMM holder to be unlocked based on the current SOC of the 30 and the remaining time information until charging of the 30 is completed.

For example, when it is identified that charging of the EV 30 is completed within a remaining time of 10 minutes, the processor 100 may transmit a notification message to the user terminal 50 and the EV charging station 20.

In this case, the user terminal 50 may, based on the notification message received from the processor 100, output a notification through a display or speaker (not shown) of the user terminal 50 or the EV charging station 20 that 10 minutes remains until the charging of the EV 30 is completed such that the user may recognize that 10 minutes remain until the charging of the EV 30 is completed.

In addition, the user terminal 50 may output a notification message indicating that the LMM 40 should be returned because there is not enough time until the charging of the EV 30 is completed. In addition, the user terminal 50 may output a notification message indicating that the use time of the LMM 40 should be extended.

The processor 100 may output the notification message as a pop-up of an application being used in the user terminal 50, or may output the notification message by transmitting the notification message as a short message service (SMS) of the user terminal 50.

The processor 100 may identify whether the LMM 40 is mounted on the LMM holder even after a predetermined time elapsing since the LMM holder is unlocked.

The processor 100 may, in response to the LMM 40 being continuously mounted on the holder, identify that the user has not used the LMM 40 and transmit a lock request for locking the LMM holder to the LMM module 41.

In addition, the processor 100 may automatically cancel the reservation of the LMM 40, and transmit a reservation cancellation notification message to the user terminal 50 such that the user may recognize the cancellation.

The processor 100 may, in response to an arrival of the EV 30 for which reservation of charging is made at the charging station 20 and a connection of the EV 30 for attempting to charge, may confirm and permit the connection.

The processor 100, while permitting the connection of the EV 30 to the charging station 20, may check reservation information for using the LMM 40, and transmit a request to unlock the LMM holder to the LMM module 41.

The processor 100 may check whether the user returns the LMM 40 at a time when the charging of the EV 30 is completed.

For example, the processor 100 may identify whether the user mounts the LMM 40 on the holder and presses a confirmation button at a time when the charging of the EV 30 is completed, to thereby check whether the LMM 40 has been normally returned.

Accordingly, theft of the LMM 40 may be prevented.

If it is identified that that the LMM 40 has not been normally returned, the processor 100 may add a penalty amount to the payment amount when charging the EV 30.

The processor 100 may include a memory (not shown) for storing data regarding an algorithm for processing operations of components in the server 10 or a program that represents the algorithm, and a processor (not shown) that executes the above described operations using the data stored in the memory. In this case, the memory and the processor may be implemented as separate chips. Alternatively, the memory and the processor may be implemented as a single chip.

The communicator 110 may include at least one component that enables communication with an external device, for example, at least one of a short-range communication module, a wired communication module, and a wireless communication module. In addition, the communicator 110 may include at least one component that enables communication with components inside the vehicle, for example, at least one of a short-range communication module, a wired communication module, and a wireless communication module.

For example, the short-range communication module may include various short-range communication modules that transmit and receive signals using a wireless communication network in a short range, such as a Bluetooth module, an infrared communication module, a radio frequency identification (RFID) communication module, a wireless local access network (WLAN) communication module, an NFC communication module, and a zigbee communication module.

The display of the user terminal 50 may include a cathode ray tube (CRT), a digital light processing (DLP) panel, a plasma display panel, a liquid crystal display (LCD) panel, an electro luminescence (EL) panel, an electrophoretic display (EPD) panel, an electrochromic display (ECD) panel, a light emitting diode (LED) panel or an organic light emitting diode (OLED), but is not limited thereto.

The network 60 may support communication between the server 10 and the EV charging station 20 and the user terminal 50, and may transmit and receive information to and from an external server using various methods, such as Radio Frequency (RF), Wireless Fidelity (Wi-Fi), a Bluetooth, a zigbee, Near Field Communication (NFC), an ultra-wideband (UWB) communication, etc. The method of performing communication with an external server is not limited thereto, and may be variously implemented as long as it can enable communication with an external server 10.

The storage (not shown) may correspond to a memory for storing the above-described information and information to be described below, and may include a nonvolatile memory device, such as a cache, a read only memory (ROM), a programmable ROM (PROM), an erasable programmable ROM (EPROM), an electrically erasable programmable ROM (EEPROM), and a flash memory, a volatile memory device, such as a random access memory (RAM), or other storage media, such as a hard disk drive (HDD), a CD-ROM, and the like, but the implementation of the storage is not limited thereto.

Figure 4:
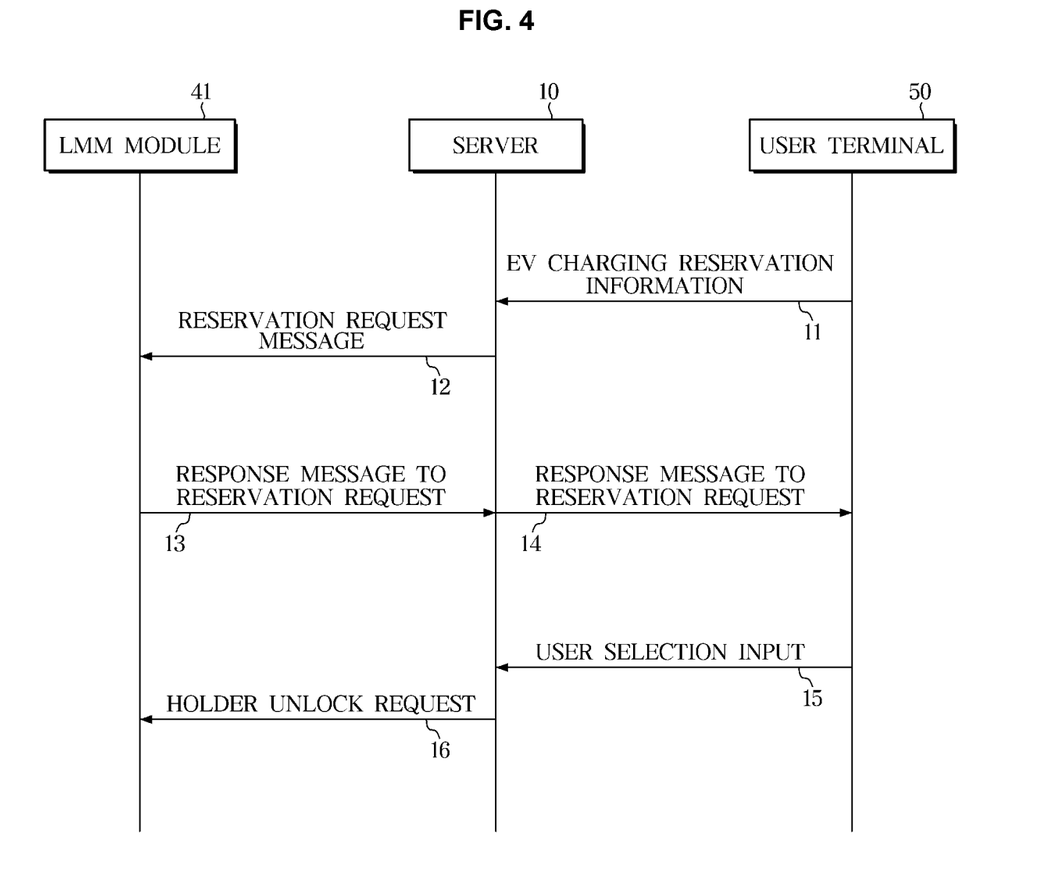
FIG. 4 is a diagram showing a processing method of an integrated system according to an embodiment of the disclosure.

FIG. 4 is a diagram showing a processing method of an integrated system (1) according to an embodiment of the disclosure.

Referring to FIG. 4, the integrated system 1 may transmit charging reservation information of the EV 30 input by the user through the user terminal 50 to the server 10 (11).

The server 10 may, based on the charging reservation information of the EV 30, transmit a reservation request message for making a reservation of the LMM 40 to the LMM module 41 (12).

In addition, the server 10 may also transmit a charging request for charging the LMM 40 at the charging station to the LMM module 41, based on the charging reservation information of the EV 30. Accordingly, charging of the LMM 40 is completed before a charging reservation time of the EV 30, so that the user may immediately use the LMM 40 while the EV 30 is being charged at the charging station.

The LMM module 41 may, in response to the reservation request message, transmit a response message including at least one of reservation available time information of the LMM 40, SOC information of the LMM 40, or payment information of the LMM 40 to the server 10 (13).

The server 10 may transmit the response message received from the LMM module 41 to the user terminal 50 such that the user may identify the reservation available time, the SOC, and the payment information of the LMM 40. Here, the payment information may include information provided by associating a mileage according to the payment amount of the LMM 40 with a mileage according to the charging amount of the EV 30 (14).

The user may select a reservation time to make a reservation for using the LMM 40. In addition, the user may check the SOC of the LMM 40, and when the LMM 40 needs to be charged, perform a selection to perform charging on the LMM 40.

In addition, the user may perform a selection to proceed with payment for the use time of the LMM 40.

The user may input a selection for the LMM 40 through the user terminal 50, and the user terminal 50 may transmit information about the selection input by the user to the server 10 (15).

The server 10 may, based on the selection input by the user, transmit a request for unlocking the LMM holder to the LMM module 41 such that the user may use the LMM 40 at a desired time.

Figure 5:
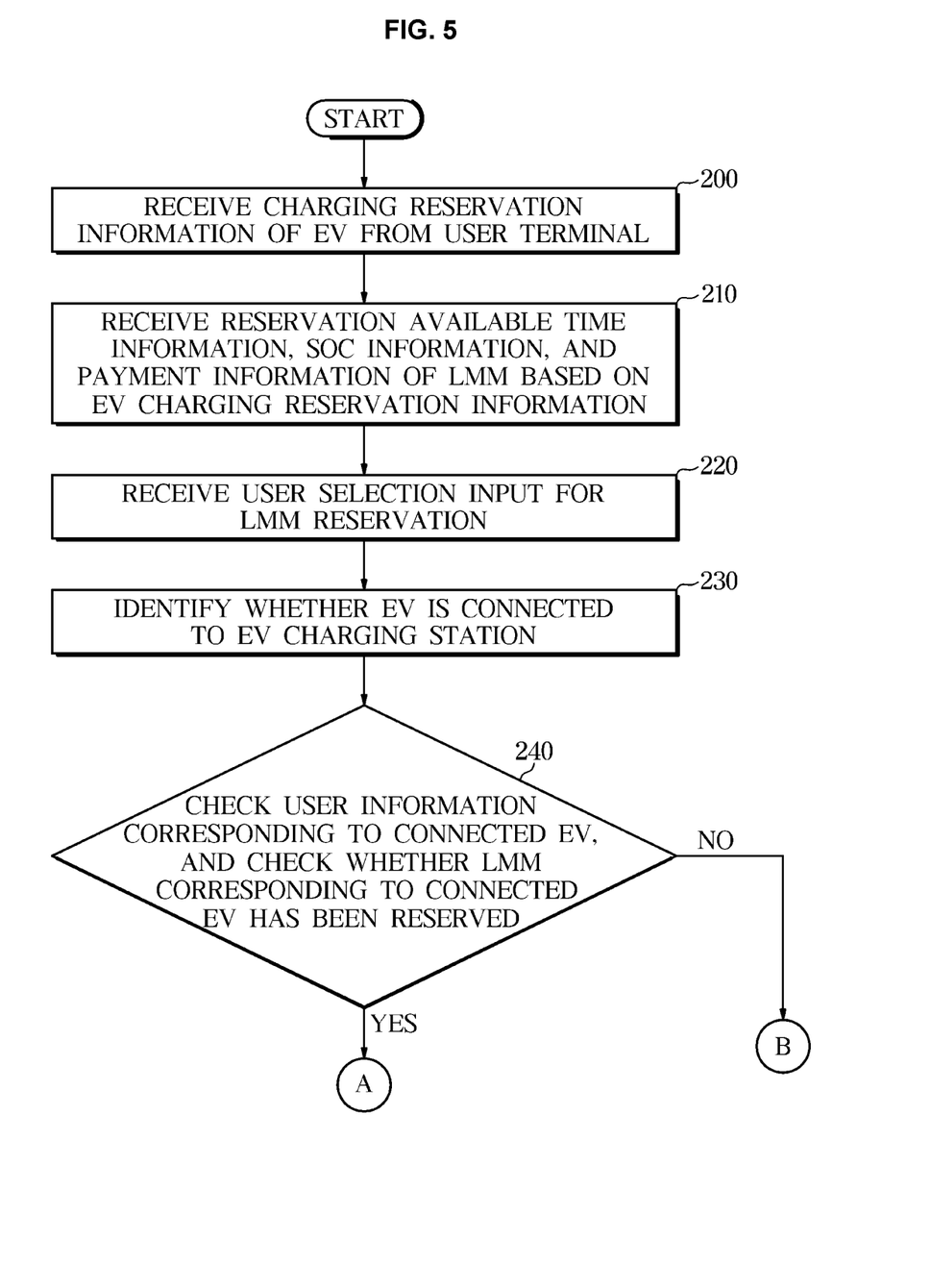
FIGS. 5 to 7 are diagrams illustrating a processing method of a server according to another embodiment of the disclosure.
Figure 6:
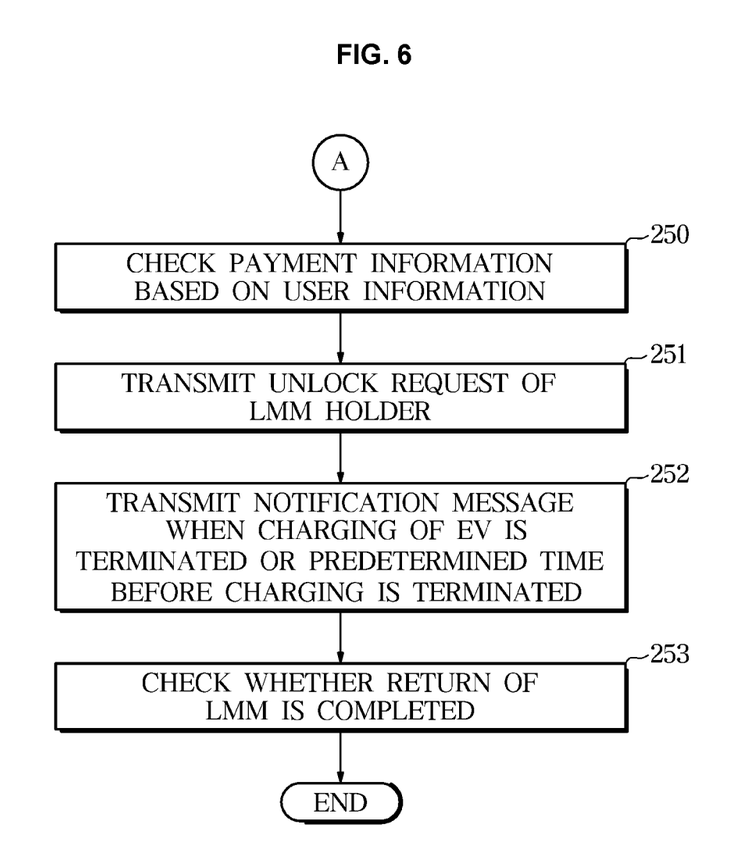
Figure 7:
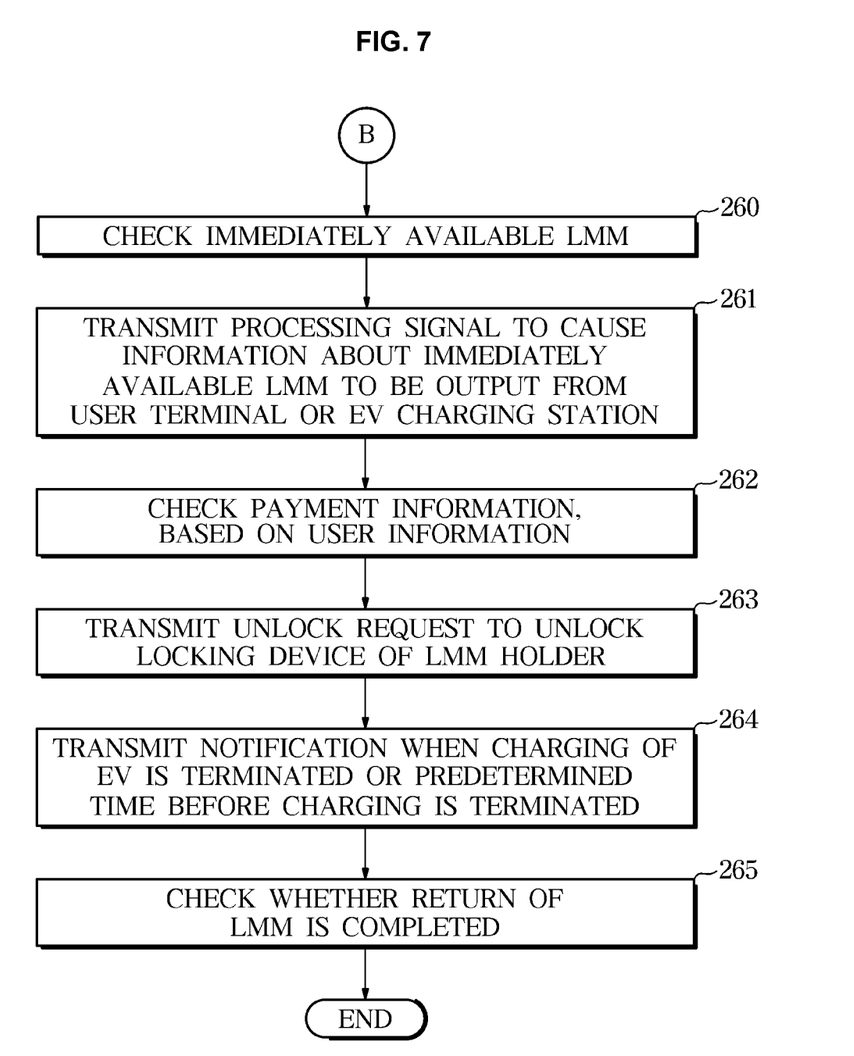

FIGS. 5 to 7 are diagrams illustrating a processing method of a server according to another embodiment of the disclosure.

Referring to FIG. 5, the server 10 may receive charging reservation information of the EV 30 from the user terminal 50 or the EV charging station 20 (200).

In particular, the server 10 may manage the charging station according to the charging reservation information for the charging station, based on the MAC address of the EV 30 registered in advance.

In addition, the server 10 may convert EV information in the form of a database based on the MAC address of the EV 30 registered in advance and store the EV information in a storage (not shown). The server 10 may manage members by designating the members according to the EV information stored in the storage (not shown).

For example, the server 10 may provide members with such methods of managing members as a charging reservation service, a pre-reservation service for renting the LMM 40, a same-day LMM rental service for members who desire to charge the LMM 40 immediately on the spot without a reservation, and a mileage linkage service according to the charge payment amount of the LMM 40 and the EV 30.

For example, the server 10 may generate such information as a previous reservation history, a use history, a damage history, a return history, a penalty amount, and a mileage of the LMM 40 for members in the form of a database, and store the information in the storage (not shown).

The server 10 may receive a message including at least one of reservation available time information, SOC information, or payment information of the LMM 40 based on the charging reservation information of the EV 30 from the LMM module 41 (210).

The server 10 may check the SOC and the availability state of the LMM 40 based on the charging reservation information of the EV 30, and display the SOC and the availability state of the LMM 40 on the user terminal 50 or the charging station 20.

For example, the server 10 may check the availability state of the LMM 40 based on the SOC of the LMM 40 that changes in real time, and transmit the availability state to the user terminal 50 and the EV charging station 20 in real time. The SOC may include states, such as a state of being charged and a state of completely charged, and the state of availability may include states, such as a state of being unavailable and a state of being rented.

For example, the server 10 may transmit a control signal to the user terminal 50 and the EV charging station 20 such that an LMM 40 in an unavailable state is indicated to be processed as a block. In addition, the server 10 may transmit a control signal to the user terminal 50 and the EV charging station 20 such that a state in which charging of the LMM 40 is completed is indicated by a dotted line, and a state in which charging of the LMM 40 is not completed is indicated by an oblique line.

The server 10 may receive a selection input by a user regarding a reservation information, a charging time, and a payment processing of the LMM 40 from the user terminal 50 or the EV charging station 20 (220).

The server 10 may identify whether the EV 30 for which charging is to be performed is connected to the charging station 20 (230).

The server 10 may check user information corresponding to the EV 30 connected to the charging station 20, and identify whether the LMM 40 corresponding to the connected EV 30 has been reserved (240).

For example, the server 10 may check whether the LMM 40 corresponding to the EV 30 has been reserved based on the MAC address of the connected EV 30.

If the LMM 40 corresponding to an EV 30 whose MAC address matches that of the EV 30 connected to the EV charging station 20 is reserved (A), the server 10 may check payment information of the LMM 40 based on the user information (250). In particular, the user information may include whether the user is designated as a member according to EV information based on the MAC address of the EV 30 registered in advance. The server 10 may classify whether the user is a member or a non-member based on the user information, and apply a different payment amount.

When it is confirmed that the user has paid the entire payment amount for the LMM 40, the server 10 may transmit an unlock request to the LMM module 41 to unlock the LMM holder such that the user may immediately use the LMM 40 (251).

The server 10 may transmit a notification message to the user terminal 50 or the EV charging station 20 when the charging of the EV 30 is terminated or a predetermined time before the charging is terminated (252).

For example, when it is identified that 10 minutes remain until the charging of the EV 30 is completed, the processor 100 transmits the notification message to the user terminal 50 and the EV charging station 20. In this case, based on the notification message received from the processor 100, the user terminal 50 may output a notification, through a display or a speaker (not shown) of the user terminal 50 or the EV charging station 20, that 10 minutes remain until the charging of the EV 30 is completed such that the user may recognize that 10 minutes remain until the charging of the EV 30 is completed.

In addition, the user terminal 50 may output a notification message indicating that the LMM should be returned because there is not much time left until the charging of the EV 30 is completed. In addition, the user terminal 50 may output a notification message that the use time of the LMM be extended.

The server 10 may check whether the user returns the LMM 40 at a time when the charging of the EV 30 is completed (253).

For example, the server 10 may identify whether the user mounts the LMM 40 on the holder and presses a confirmation button at a time when the charging of the EV 30 is completed, to thereby check whether the LMM 40 has been normally returned.

If the LMM 40 corresponding to an EV 30 whose MAC address matches that of the EV 30 connected to the charging station 20 is not reserved (B), the server 10 may check whether there is a LMM 40 immediately available (260).

The server 10 may transmit a processing signal to the user terminal 50 or the EV charging station 20 such that information about the immediately available LMM 40 is output from the user terminal 50 or the EV charging station 20 (261).

The server 10 may check payment information for the LMM 40 based on the user information (262). In particular, the user information may include whether the user is designated as a member according to EV information based on the MAC address of the EV 30 registered in advance. The server 10 may classify whether the user is a member or a non-member based on the user information, and apply a different payment amount.

When it is confirmed that the user has paid the entire payment amount of the LMM 40, the server 10 may transmit an unlock request to the LMM module 41 to unlock the LMM holder such that the user may immediately use the LMM 40 (263).

The server 10 may transmit a notification message to the user terminal 50 or the charging station 20 when the charging of the EV 30 is terminated or a predetermined time before the charging is terminated (264).

The server 10 may check whether the user returns the LMM 40 at a time when the charging of the EV 30 is completed (265).

Meanwhile, the disclosed embodiments may be embodied in the form of a recording medium storing instructions executable by a computer. The instructions may be stored in the form of program code and, when executed by a processor, may generate a program module to perform the operations of the disclosed embodiments. The recording medium may be embodied as a computer-readable recording medium.

The computer-readable recording medium includes all kinds of recording media in which instructions which may be decoded by a computer are stored, for example, a Read Only Memory (ROM), a Random Access Memory (RAM), a magnetic tape, a magnetic disk, a flash memory, an optical data storage device, and the like.

As is apparent from the above, the vehicle according to the present disclosure and the method of controlling the same can effectively link an LMM, which is a transportation method from an EV charging station to a final destination. In particular, a reservation and payment for using an LMM can be performed at an EV charging station and a user terminal, thereby increasing the convenience of use.

In addition, the EV charging station his electrically connected with a holder on which an LMM is mounted, so that an LMM can be efficiently charged using active power while an EV is not being charged at the EV charging station.

A mileage service according to a payment amount used for charging an EV can also be used for a service using an LMM, so that a user can use an EV and an LMM more efficiently.

Although embodiments of the present disclosure have been described for illustrative purposes, those skilled in the art will appreciate that various modifications, additions and substitutions are possible, without departing from the scope and spirit of the disclosure. Therefore, embodiments of the present disclosure have not been described for limiting purposes.

What is claimed is:

1. A server, comprising:
 a communicator configured to communicate with a user terminal, an electric vehicle (EV), a last mile mobility (LMM) configured to be mounted on an LMM holder, and an EV charging station through a wireless communication network; and a processor configured to:
receive charging reservation information of the EV from the user terminal through the communicator;
based on the charging reservation information of the EV, transmit a request message for reservation of use of the LMM to an LMM module of the LMM;
transmit a response message responsive to the request message received from the LMM module of the LMM, to the user terminal;
receive a user selection input from the user terminal including at least a reservation time of the LMM;
in response to the user selection input from the user terminal, transmit an unlock request to the LMM module; and
remotely unlock the LMM holder electrically connected to the EV charging station at the reservation time.

2. The server of claim 1, wherein the processor is configured to, based on the charging reservation information of the EV, transmit a charging request for charging the LMM mounted on the LMM holder in the EV charging station, to the LMM module.

3. The server of claim 1, wherein the response message includes payment information of the LMM.

4. The server of claim 1, wherein the user selection input includes a selection input for proceeding with a payment for using the LMM.

5. The server of claim 1, wherein the processor is configured to, upon the EV vehicle being connected to the EV charging station, receive the charging reservation information of the EV based on a media access control (MAC) address of the EV, and
based on the charging reservation information of the EV vehicle, transmit information about a current state of charge (SOC) of the EV and a remaining time until charging is completed to the LMM module.

6. The server of claim 1, wherein the processor is configured to transmit a notification message to at least one of the user terminal or the EV charging station based on the charging reservation information of the EV.

7. The server of claim 6, wherein the notification message includes at least one of a notification for extending a use time of the LMM or a notification for guiding the LMM to be mounted on the LMM holder.

8. The server of claim 1, wherein upon a predetermined time elapsing since the LMM holder is unlocked, if it is determined that the LMM continues being mounted on the LMM holder, the processor is configured to transmit a lock request to lock the LMM holder to the LMM module.

9. The server of claim 1, wherein the processor is configured to receive SOC information of the LMM and availability state information of the LMM from the LMM module in real time.

10. The server of claim 1, wherein the LMM includes at least one of an electric kickboard, an electric bicycle, a skateboard, or a SEGWAY.

11. A processing method of a server having a communicator configured to communicate with a user terminal, an electric vehicle (EV), a last mile mobility (LMM) configured to be mounted on an LMM holder, and an EV charging station through a wireless communication network, the method comprising:
receiving charging reservation information of the EV from a user terminal through the communicator;
based on the charging reservation information of the EV, transmitting a request message for reservation of use of the LMM to an LMM module of the LMM;
transmitting a response message responsive to the request message received from the LMM module of the LMM, to the user terminal;
receiving a user selection input from the user terminal including at least a reservation time of the LMM;
in response to the user selection input from the user terminal, transmitting an unlock request to the LMM module; and
remotely unlocking the LMM holder electrically connected to the EV charging station at the reservation time.

12. The method of claim 11, further comprising, based on the charging reservation information of the EV, transmitting a charging request for charging the LMM mounted on the LMM holder in the EV charging station, to the LMM module.

13. The method of claim 11, wherein the response message includes payment information of the LMM.

14. The method of claim 11, wherein the user selection input includes a selection input for proceeding with a payment for using the LMM.

15. The method of claim 11, further comprising:
upon the EV vehicle being connected to the EV charging station, receiving the charging reservation information of the EV based on a media access control (MAC) address of the EV, and
based on the charging reservation information of the EV vehicle, transmitting information about a current state of charge (SOC) of the EV and a remaining time until charging is completed to the LMM module.

16. The method of claim 11, further comprising transmitting a notification message to at least one of the user terminal or the EV charging station based on the charging reservation information of the EV.

17. The method of claim 16, wherein the notification message includes at least one of a notification for extending a use time of the LMM or a notification for guiding the LMM to be mounted on the LMM holder.

18. The method of claim 11, further comprising, upon a predetermined time elapsing since the LMM holder is unlocked, if it is determined that the LMM continues being mounted on the LMM holder, transmitting a lock request to lock the LMM holder to the LMM module.

19. The method of claim 11, comprising receiving SOC information of the LMM and availability state information of the LMM from the LMM module in real time.

20. A charging station integration system connected to a communicator of a server to communicate with a user terminal, an electric vehicle (EV), a last mile mobility (LMM) configured to be mounted on an LMM holder, and an EV charging station through a wireless communication network, the charging station integration system comprising:
the user terminal configured to receive charging reservation information of the EV, and to receive a selection for reservation of the LMM;
an LMM module of the LMM configured to receive the charging reservation information of the EV from the user terminal, and transmit a response message responsive to a request message for reservation of use of the LMM to the user terminal; and
the server configured to receive a user selection input from the user terminal including at least a reservation time of the LMM, in response to the user selection input from the user terminal, transmit an unlock request to the LMM module, and remotely unlock the LMM holder electrically connected to the EV charging station at the reservation time.

\* \* \* \* \*